United States Patent
Marom et al.

(10) Patent No.: US 12,118,558 B2
(45) Date of Patent: Oct. 15, 2024

(54) ESTIMATING QUANTILE VALUES FOR REDUCED MEMORY AND/OR STORAGE UTILIZATION AND FASTER PROCESSING TIME IN FRAUD DETECTION SYSTEMS

(71) Applicant: Actimize LTD., Ra'anana (IL)

(72) Inventors: Tsafrir Marom, Kfar Yona (IL); Shlomi Weizman, Modiin-Maccabim-Rehut (IL); Amir Shachar, Haifa (IL)

(73) Assignee: ACTIMIZE LTD., Ra'anana (IL)

( * ) Notice: Subject to any disclaimer, the term of this patent is extended or adjusted under 35 U.S.C. 154(b) by 498 days.

(21) Appl. No.: 17/243,018

(22) Filed: Apr. 28, 2021

(65) Prior Publication Data
US 2022/0358504 A1    Nov. 10, 2022

(51) Int. Cl.
*G06Q 20/40*   (2012.01)
*G06Q 30/018*  (2023.01)

(52) U.S. Cl.
CPC ..... *G06Q 20/4016* (2013.01); *G06Q 30/0185* (2013.01)

(58) Field of Classification Search
CPC .......... G06Q 20/4016; G06Q 30/0185; G06Q 20/354
USPC ......... 705/1.1, 37, 75, 35; 707/740, 15, 693, 707/715, 602; 708/270, 207; 719/318; 702/180; 382/267
See application file for complete search history.

(56) References Cited

U.S. PATENT DOCUMENTS

| 10,127,192 B1 * | 11/2018 | Hu ........................ G06F 17/18 708/207 |
| 10,685,018 B1 * | 6/2020 | Blatt ................... G06F 16/2474 707/715 |

(Continued)

FOREIGN PATENT DOCUMENTS

| WO | WO-2013019995 A1 * | 2/2013 | ........... G06Q 20/354 |
| WO | WO-2014160296 A1 * | 10/2014 | ............ G06Q 10/04 |
| WO | WO-2021076775 A1 * | 4/2021 | ........... G06F 16/144 |

OTHER PUBLICATIONS

Chen, Zhiwei and Aoqian Zhang. "A survey of approximate quantile computation on large-scale data" IEEE Access 8 (2020) 34585-34597 pp. 1-13 (Year: 2020).*

(Continued)

*Primary Examiner* — Lynda Jasmin
*Assistant Examiner* — Kimberly L Evans
(74) *Attorney, Agent, or Firm* — Haynes and Boone, LLP

(57) ABSTRACT

A system is provided for estimating quantile values for fraud assessments. The system includes a processor and a computer readable medium operably coupled thereto, to perform operations which include capturing one or more first data values for a quantile value profile associated with an entity, wherein the quantile value profile includes one of real values or a first plurality of quantile marker values calculated from the real values, accessing the quantile value profile for the entity, determining a first number of the one or more first data values, and based on the first number of the one or more first data values and the one of the real values or the first plurality of quantile marker values in the quantile value profile, performing one of a first merge operation, a second merge operation, or a third merge operation.

20 Claims, 8 Drawing Sheets

(56) References Cited

U.S. PATENT DOCUMENTS

| | | | |
|---|---|---|---|
| 11,693,842 B2* | 7/2023 | Masson | G06F 11/3082 |
| | | | 707/693 |
| 2003/0088542 A1* | 5/2003 | McGee | G06F 11/323 |
| | | | 702/180 |
| 2006/0101048 A1* | 5/2006 | Mazzagatti | G06F 16/2246 |
| | | | 707/740 |
| 2009/0222369 A1* | 9/2009 | Zoldi | G06Q 20/4016 |
| | | | 705/35 |
| 2010/0292995 A1* | 11/2010 | Bu | G06Q 30/02 |
| | | | 705/1.1 |
| 2014/0096146 A1* | 4/2014 | Maor | G06F 11/3452 |
| | | | 719/318 |
| 2016/0350396 A1* | 12/2016 | Blanc | G06F 16/27 |
| | | | 707/740 |
| 2017/0365000 A1* | 12/2017 | Wittkotter | G06F 16/2456 |
| | | | 705/37 |
| 2019/0258697 A1* | 8/2019 | Wu | G06F 17/18 |
| | | | 708/270 |
| 2020/0004868 A1* | 1/2020 | Rao | G06F 16/2379 |
| | | | 707/602 |
| 2021/0342847 A1* | 11/2021 | Shachar | G06N 20/00 |
| | | | 705/75 |

OTHER PUBLICATIONS

Jain, R. et al., The $P^2$ Algorithm for Dynamic Calculation of Quantiles and Histograms Without Storing Observations, *Communications of the ACM*, Oct. 1985, vol. 28, No. 10, at pp. 1076-1085. https://cacm.acm.org/magazines/1985/10 and original link provided by authors: https://www.cse.wustl.edu/~jain/papers/ftp/psqr.pdf.

Tibshirani, Ryan J., *Fast Computation of the Median by Successive Binning*; Oct. 14, 2008, 15 pages, Dept. of Statistics, Stanford University, Stanford, CA 94305. https://arxiv.org/abs/0806.3301.

\* cited by examiner

ESTIMATING QUANTILE VALUES FOR REDUCED MEMORY AND/OR STORAGE UTILIZATION AND FASTER PROCESSING TIME IN FRAUD DETECTION SYSTEMS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to big data storage for fraud detection and intelligent computing systems, and more specifically to a system and method for estimating quantile values for large data sets to reduce required data storage sizes, memory consumption, CPU utilization, and data passing through a network, while increasing processing speed in data systems.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized (or be conventional or well-known) in the prior art. The subject matter in the background section merely represents different approaches, which in and of themselves may also be inventions.

A networked computing system may require processes to estimate quantile values and measures, such as median values, in large data sets to reduce overall data storage, memory consumption, CPU utilization, and data passing through a network, while improving data processing performance of computing systems with large data warehouses. For example, a networked computing system may correspond to a cloud computing system or environment having cloud computing tenants corresponding to a company, organization, or other entity that utilize fraud detection and other computing services of the cloud computing system. However, other networked computing systems may also be provided for estimating quantile values. This networked computing system may be exposed to large data sources from clients, customers, tenants, and other entities interacting with the networked computing system. Median values, quantiles, and other percentile metrics, including Median or Quantile Absolute Deviations (MAD or QAD) may provide important measures for fraud analysis and detection, risk prevention, and the like. For example, fraudulent transactions and other perpetrated fraud may commonly be outliers in the corresponding data set. However, measures such as average and standard deviation may be affected by the outliers, while measures such as median, quantiles, and MAD or QAD may not be affected.

While averages and standard deviations are statistical measures that are affected by outliers, but median, quantiles, and MAD or QAD are not. To best calculate median, quantiles, and MAD or QAD values, the networked computing system may require large databases, repositories and data warehouses and significant memory utilization. For example, in order to calculate median, quantiles, MAD or QAD values, and other statistical measures, an entire data set of values that those measures are based on is required to be stored. In some embodiments, the data set consists of millions of values, such as when reviewing and detecting fraud in transaction data sets for large institutions (e.g., banks, companies, and the like). Thus, the existing solutions do not provide operations to estimate the useful measures with high accuracy without storing the entire (or nearly the entire) set of values, which requires and consumes large amounts of resources for data storage and memory during data processing. Computing median, quantiles, and MAD or QAD from a dataset stored in a database requires fetching all the dataset into the memory, sorting the values, and selecting the required percentiles from the in memory sorted values.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In the figures, elements having the same designations have the same or similar functions.

DETAILED DESCRIPTION

Figure 1:
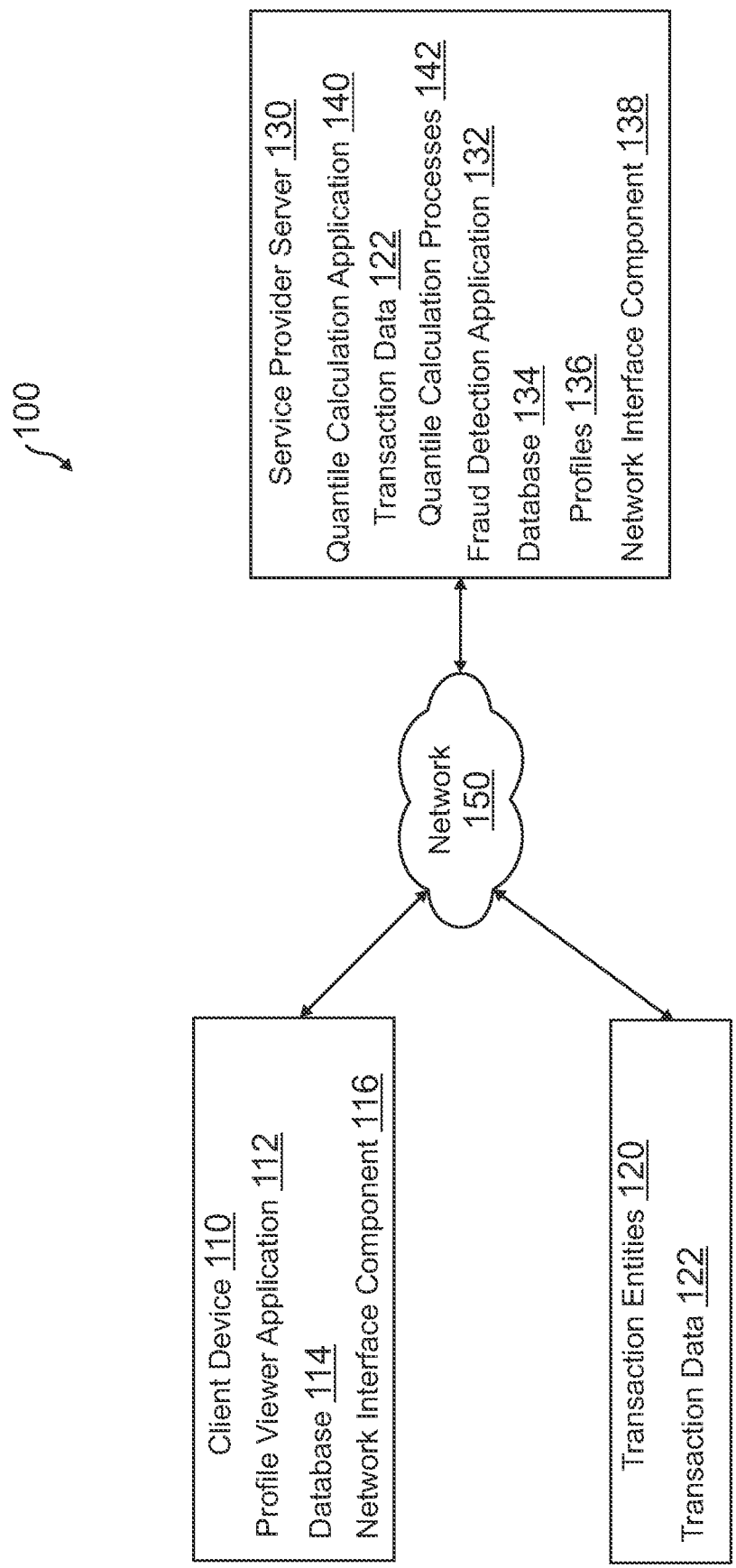
FIG. 1 is a block diagram of a networked computing environment suitable for implementing the processes described herein according to an embodiment.

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one of ordinary skill in the art.

In this description, specific details are set forth describing some embodiments consistent with the present disclosure. Numerous specific details are set forth in order to provide a thorough understanding of the embodiments. It will be apparent, however, to one of ordinary skill in the art that some embodiments may be practiced without some or all of these specific details. The specific embodiments disclosed herein are meant to be illustrative but not limiting. One of ordinary skill in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Overview

For a networked computing system, methods, data structures, and systems are provided for estimating quantile values for reduced memory and/or storage utilization and faster processing time in fraud detection and other intelligent decision-making systems. A cache and/or database system stores accumulated data over a time period, which may include data values associated with tracked, monitored, and captured data. The data may correspond to transaction data, such as transaction values, amounts, or totals for transactions processed by an entity (e.g., an individual user, account, business, company, financial institution, or the like). However, other values may also be captured and accumulated for other types of data, such as dates, scores, counts, true and/or false states, ordinal categories, balances, ratios, alpha-numeric strings, serial numbers, list sizes, values sorted in a descending order, and the like. Thus, the networked computing system may listen for this data over the time period and refine the data in a data set that includes processable database views and data tables.

In order to reduce data storage sizes, memory consumption, CPU utilization, and data passing through a network, while increasing processing speed, for large data sets, the network computing system may provide a processing engine for data sets that allows for estimating measures of the values in the data set, thereby reducing data size and storage requirements. These measures may include median values, quantiles values, Median or Quantile Absolute Deviations (MAD or QAD), and the like. The processing engine may process, transform, and/or merge two data sets for an entity and/or type of data values (e.g., transaction values). A first data set may be collected over a first time period and may correspond to a vesting data set that is captured over the first time period. This may correspond to data values that are captured from a processing system (e.g., a fraud detection and/or electronic transaction processing system associated with a financial entity or transaction processor). A second data set for an entity may correspond to a historical data set, which may be stored with a quantile value profile for the entity. In some embodiments, the vesting data set may be captured over a day, and the historical data set in the quantile value profile over a month or longer. However, other time periods may also be used for capturing data values, such as an hour, day, week, month, quarter, year, or the like.

In a given set of historical numerical values captured for the vesting data set and/or in the quantile value profile, a number of data values is determined. If the number of values does not exceed twenty values, real values may remain in the data set(s). This allows for direct calculation of a median or quantile measures due to the small size of the data set, which does not require estimation to reduce data storage sizes, memory consumption, CPU utilization, and data passing through a network, while increasing processing speed. However, if the number of values meets or exceeds the threshold twenty values, an estimation algorithm is applied to the values to reduce the data values to a set of quantile estimations. Another higher or lower threshold for a number of real values may also be used based on data storage requirements and/or computing limitations. The set of quantile estimates corresponds to percentiles associated with predetermined markers established for the quantiles to be estimated. In some embodiments, five predetermined marker quantiles may be established and calculated, such as a minimum value, 25% value, 50% value, 75% value, and a maximum value. However, other predetermined marker quantiles may also be used (e.g., eleven having a minimum, 10%, 20%, 30%, 40%, 50%, 60%, 70%, 80%, 90%, and a maximum.

A natural logarithm (ln) function may then be applied to the quantile values to calculate the ln of the values. Thereafter, the predetermined marker quantile values are then determined based on the number, percentiles, and/or values for the markers. Where the entity does not have a quantile value profile and/or historical data set for the corresponding values stored in the profile, the vesting data set may then be used to generate and/or merge as a new or fresh data set to a quantile value profile. However, for subsequent numeric values that are added to the quantile value profile as ln-transformed value, the appropriate marker is required to be updated based on the new ln-transformed value(s). Thus, there may be three or more different merging operations, one where real values are less than the threshold and merged directly between the vesting data set and the historical data set in the quantile value profile, two where ln-transformed values are merged for quantile value markers, and/or three where real and ln-transformed values are merged for quantile value markers.

To estimate the quantile values using the ln-transformed values and adjust the quantile marker values and measures with increased accuracy and without storing the entire set of values, an algorithm, technique, and computing framework to estimate the markers is utilized. The algorithm estimates several statistical markers of the data set by assuming that between any three markers a single distinct parabola passes through those values and can be estimated. Thus, for each subsequent numeric value that is added to the data set as an ln-transformed value, the appropriate markers move slightly according to the ln-transformed value's position within the markers. Thus, the algorithms and framework may consider five markers (or other marker number as designated) instead of the whole dataset to estimate the quantiles. The ln-transformed values for the quantiles may then be inversed when calculating one or more statistical measures for a fraud detection or other computing system to reduce data storage sizes, memory consumption, CPU utilization, and data passing through a network, while increasing processing speed. In this regard, data storage efficiency is maximized. For example, a marker may only require 28 bytes, but millions of individual values would require significantly larger storage.

The embodiments described herein provide methods, computer program products, and computer database systems for estimating quantile values for generating and updating a quantile value for a networked computing system. The algorithms, techniques, and frameworks estimate measures accurately, while having a low storage footprint and fast data access and processing. According to some embodiments, in a networked computing system accessible by a plurality of separate and distinct organizations, a quantile estimation system is provided for estimating quantile values, thereby reducing data storage size and conserving computing and storage resources. The quantile estimation system further enhances fraud detection and other intelligent decision-making and data processing systems by estimating quantile values to a high accuracy to reduce data storage sizes, memory consumption, CPU utilization, and data passing through a network, while increasing processing speed, for of data sets required to be processed through the computing resources of such systems.

Example Environment

The system and methods of the present disclosure can include, incorporate, or operate in conjunction with or in the environment of an automation engine, database, and portal, which may include cloud-based computing architecture. FIG. 1 is a block diagram of a networked environment 100 suitable for implementing the processes described herein according to an embodiment. As shown, environment 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided, by such devices and/or servers may be combined or separated for a given embodiment and may be performed by a greater number or fewer number of devices and/or servers. For example, cloud-based architectures have been developed to improve collaboration, integration, and community-based cooperation between users without sacrificing data security. One or more devices and/or servers may be operated and/or maintained by the same or different entities.

FIG. 1 illustrates a block diagram of an example environment 100 according to some embodiments. Environment 100 may include a client device 110, transaction entities 120, and a service provider server 130 for data processing for estimating quantile values for reduced memory and/or storage utilization and faster processing time in fraud detection and other intelligent decision-making systems. In other embodiments, environment 100 may not have all of the components listed and/or may have other elements instead of, or in addition to, those listed above. In some embodiments, environment 100 is an environment in which processing of data values in data sets for estimating quantile values for quantile markers is provided. Client device 110 may be any machine or system that is used by a user to display user interfaces to request and view estimated quantile values and corresponding results for processing quantile values, such as through a fraud detection system. For example, client device 110 can be a handheld computing device, a mobile phone, a laptop computer, a notepad computer, a work station, and/or a network of computing devices. As illustrated in FIG. 1, client device 110 might interact via a network 150 with service provider server 130 which requests data from service provider server 130 and processes received data for display to cloud computing tenants.

Client device 110 may be utilized in order to request information regarding a quantile value profile for an entity, as well as request operations that may utilize estimated quantile values in the profile. Thus, client device 110 may be utilized by an employee, member, agent, management, or the like of an organization. Client device 110 may correspond to a device, server, or the like that interfaces with service provider server 130 to utilize computing services, applications, data storage, and the like, which may include use of a cloud computing environment. Client device 110 may utilize a profile viewer application 112 to perform these interactions with service provider server 130 such as to access, view, and/or utilize data for one or more quantile value profiles for one or more entities. Service provider server 130 may receive a unique identifier (ID) for a quantile value profile and/or a request for data processing using a quantile value profile, which may have the corresponding estimated quantile values discussed herein. Thereafter, profile viewer application 112 may display the profile and/or data processing results. Additionally, profile viewer application 112 may further be used to request generation of a quantile value profile for a specific entity and/or data set, which may be generated by determining the estimated quantile values for certain measures of a data set, as discussed herein.

Service provider server 130 may be utilized by different entities, customers, and/or cloud computing tenants to perform processes for estimating quantile values for reduced memory and/or storage utilization and faster processing time in fraud detection and other intelligent decision-making systems. Service provider server 130 may capture, accumulate, and refine data values for a particular type of data into data sets that include data records, tables, and/or views having the data values. Quantile calculation application 140 may include operations to calculate quantile values and quantile value estimates through the use of real values and ln-transformed values. For example, service provider server 130 may be connected with and/or in communication with transaction entities 120 to listen for and capture transaction data 122. Transaction entities 120 may correspond to individual users, groups of users, companies or businesses, organizations, financial institutions, card processors and/or card processing networks, and the like which may generate and/or provide transaction data 122. However, other types of entities may also provide data processed in similar manner to that discussed herein, for example, for those entities to conserve data storage resources by reducing large data sets to quantile value estimations.

In some embodiments, service provider server 130 may provide transaction processing services in order to capture transaction data 122. However, in other embodiments, service provider server 130 may listen, capture, and/or receive transaction data 122 from other transaction processing services, such as financial entities, companies, individual users or groups of users, and the like. Although transaction data 122 is described as data values for transaction data sets, in other embodiments, different data values may be captured including dates, scores, counts, true and/or false states, ordinal categories, balances, ratios, alpha-numeric strings, serial numbers, list sizes, values sorted in a descending order, and/or the like.

To process transaction data 122, quantile calculation application 140 further includes quantile calculation processes 142. Quantile calculation application 140 may capture and accumulate transaction data 122 over a time period into data values for a data set to be processed with one or more of profiles 136. Once data for one or more entities is accumulated over the time period, the data may be refined by quantile calculation processes to standardize and format the data into data views and data tables. These data views may correspond to the data values used to determine quantile values and/or markers for certain statistical measures used by a fraud detection application 132. Thus, the data values from transaction data 122 may be placed in a vesting data set for persistence in one or more of profiles 136. To determine quantile values and/or estimates of those values for a particular entity by quantile calculation processes 142, each corresponding profile 136 for the entity may be accessed and retrieved. Profiles 136 may include one of real numbers or values for previous transaction data values, or instead the profile may have quantile value markers and/or MAD/QAD values if quantile values have been estimated. These real values and/or quantile value estimates may be persistently stored in a historical data set for use with one or more data processing operations. If no profile exists for an entity, the vesting data set may then be processed to generate a profile for the entity and store the profile with profiles 136.

When determining if real data values or estimated quantile value markers are to be stored in the corresponding profile for the entity by quantile calculation processes 142, a number of the data values from transaction data 122 and/or in the profile of the entity may be determined. For example, if the number of values shared between the data sets is less than twenty or another predetermined threshold (e.g., based on data storage requirements), then the real values may be persistently stored to the profile for the entity. However, if one or more data sets include quantile value markers determined from data values (e.g., using ln-transformation or another data transformation of the data values), a marker update and quantile value estimation operation and algorithm may be utilized to combine the data sets and persist the vesting data set to the corresponding one of profiles 136 for the entity. The operations, techniques, and algorithms to merge such data values and marker values by quantile calculation processes 142 is described in further detail with regard to FIGS. 2-7. An exemplary data table having estimated quantile values based on quantile value markers, and updating such markers, is shown further in FIG. 5.

Profiles 136 having the corresponding real values and/or estimated quantile value markers may be stored to a database 134. One or more other applications, such as profile viewer application 112 and/or fraud detection application 132 may thereafter access profiles 136 during data processing, such as to view estimated quantile values for the quantile markers and/or utilize those estimated quantile values when performing fraud detection, respectively. For example, service provider server 130 may provide profiles 136 over network 150 to client device 110 for output through one or more UIs and/or use with data processing operations. Service provider server 130 may further provide profiles 136 to fraud detection application 132 when performing a fraud assessment and/or identifying fraudulent transactions. For example, profiles 136 may be used in conducting a risk analysis of a transaction for approval/denial and/or when reviewing processed transactions to identify fraud.

The users of client device 110 and/or service provider server 130 may differ in their respective capacities, and the capacity of users and entities using client device 110 and/or service provider server 130. These capacities might be entirely determined by applications, permissions, and profiles for a current user. For example, where an employee is using a device to interact with service provider server 130 and view profiles 136, that user system has the capacities allotted to that employee and those computing events may be associated with an employee. However, where an administrator or manager is using client device 110 to lookup profiles 136, that client device 110 has the capacities allotted to that administrator and may perform actions associated with that administrator. Thus, different users may have different capabilities, different permissions, and perform different events, with regard to viewing and/or processing data associated with profiles 136 with service provider server 130. Both client device 110 and service provider server 130 may execute a web-based client that accesses a web-based application for service provider server 130 or may utilize a rich client, such as a dedicated resident application, to access service provider server 130.

Client device 110 may also typically utilize one or more user interface devices, such as a keyboard, mouse, trackball, touch pad, touch screen, pen or the like, for interacting with a graphical user interface (GUI) (e.g., one or more of user interfaces 114) provided by an application or browser on a display (e.g., a monitor screen, liquid crystal display (LCD) monitor, light emitting diode (LED) monitor, organic light emitting diode (OLED) monitor, etc.) in conjunction with pages, forms, applications, and other information provided by the service provider server 130 or other systems or servers through the web-based or rich client. For example, the user interface device can be used to access data and applications hosted by service provider server 130 and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

Client device 110 might communicate via a network interface component 118 with service provider server 130 using TCP/IP and, at a higher network level, use other common Internet protocols to communicate, such as hypertext transfer protocol (HTTP or HTTPS for secure versions of HTTP), file transfer protocol (FTP), wireless application protocol (WAP), etc. Similarly, service provider server 130 may communicate with one or more computing devices, servers, and/or data resources, including client device 110 and/or transaction entities 120, via a network interface component 138 using the same or similar Internet protocols. In an example where HTTP/HTTPS is used, client device 110 might include an HTTP/HTTPS client commonly referred to as a "browser" for sending and receiving HTTP// HTTPS messages to and from an HTTP//HTTPS server, such as service provider server 130. Such an HTTP/HTTPS server might be implemented as the sole network interface between client device 110, transaction entities 120, and/or service provider server 130 but other techniques might be used as well or instead. In some implementations, the interface between client device 110, transaction entities 120, and service provider server 130 includes load sharing functionality.

Client device 110, transaction entities 120, and/or service provider server 130 may utilize network 150 to communicate with/or each other, which is any network or combination of networks of devices that communicate with one another. For example, network 150 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the Internet. However, it should be understood that the networks that the present embodiments might use are not so limited, although TCP/IP is a frequently implemented protocol.

According to one embodiment, service provider server 130 is configured to provide webpages, forms, applications, data, and media content to client device 110 and/or transaction entities 120, and/or to receive data from client device 110 and/or transaction entities 120, including data associated with transaction data 122 and/or profiles 136. As such, service provider server 130 provides security mechanisms to keep data secure. Additionally, the term "system" is meant to include a computer system and/or server(s), including processing hardware and process space(s), and an associated storage system and database application (e.g., object-oriented data base management system (OODBMS) or relational database management system (RDBMS)). It should also be understood that "server system" and "system" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

In some embodiments, profile viewer application 112 of client device 110, shown in FIG. 1, may correspond to the applications and API services that provide UIs (web browser, desktop application, etc.) to a user or entity (e.g., an organization and/or member of the organization, such as an employee, staff, officer, HR and/or hiring department, and the like for a company) to interact with service provider server 130. Service provider server 130 may execute fraud detection application 132 and/or quantile calculation application 140 to interact with profile viewer application 112. For example, in one embodiment, service provider server 130 includes application servers configured to implement and execute software applications as well as provide related data, code, forms, webpages, and other information associated with fraud detection application 132 and/or quantile calculation application 140, and to store to, and retrieve from, a database system related data, objects, and web page content associated with fraud detection application 132 and/or quantile calculation application 140. For example, service provider server 130 may implement various functions of fraud detection application 132 and/or quantile calculation application 140, and the processing space for executing system processes, such as running applications as part of fraud detection application 132 and/or quantile calculation application 140. Additional processes that may execute on service provider server 130 include database indexing processes associated with data received from client device 110 and/or transaction entities 120.

Several elements in the system shown in FIG. 1 include elements that are explained briefly here. For example, client device 110 could include a desktop personal computer, workstation, laptop, notepad computer, PDA, cell phone, or any wireless access protocol (WAP) enabled device or any other computing device capable of interfacing directly or indirectly to the Internet or other network connection. Client device 110 typically runs an HTTP/HTTPS client, e.g., a browsing program, such as Microsoft Internet Explorer® or Edge® browser, Google Chrome® browser, Mozilla Firefox® browser, or a WAP-enabled browser in the case of a cell phone, notepad computer, PDA or other wireless device, or the like. According to one embodiment, each of client device 110 and/or service provider server 130 and all of its components are configurable using applications including computer code run using one or more central processing unit, such as an Intel Pentium® processor or the like. Similarly, service provider server 130 and all of its components might be operator-configurable using application(s) including computer code to run using a central processing unit, which may include an Intel Pentium® processor or the like, and/or multiple processor units. In this regard, service provider server 130 functions may be performed by a greater number of devices and/or servers to form a cloud-based environment to provide online services to cloud computing tenants through cloud computing and cloud-based service delivery. This cloud computing environment therefore may provide and/or improve data processing, storage, and retrieval through networked servers and devices forming the cloud computing environment. A computer program product embodiment includes a machine-readable storage medium (or media) having instructions stored thereon/in which can be used to program a computer to perform any of the processes of the embodiments described herein utilizing one or more computing devices.

Computer code for operating and configuring client device 110 and/or service provider server 130 to intercommunicate and to process webpages, applications and other data and media content as described herein are preferably downloaded and stored on a hard disk, but the entire program code, or portions thereof, may also be stored in any other volatile or non-volatile memory medium or device corresponding to database 116 of client device 110 and/or database 134 of service provider server 130 such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. For example, database 116 and/or database 134 may store application and system data associated with providing and administering profile viewer application 112, fraud detection application 132, and/or quantile calculation application 140. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

Computing Environment and Architecture

Figure 2:
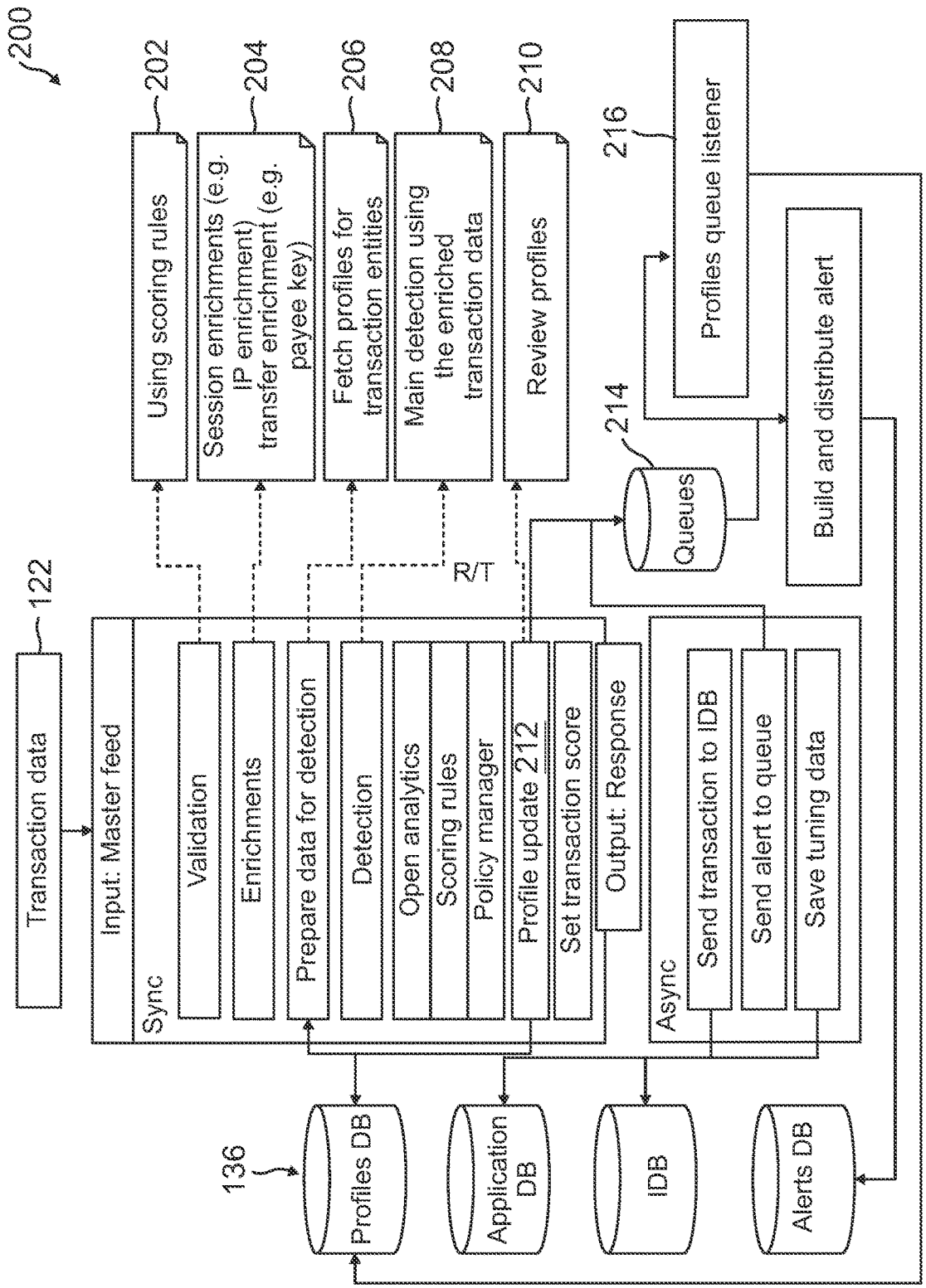
FIG. 2 is a block diagram of fraud detection system using quantile value profiles according to an embodiment.

FIG. 2 is a block diagram of fraud detection system using quantile value profiles according to an embodiment. Environment 200 of FIG. 2 includes an internal processing system of service provider server 130 for processing of transaction data 122 with profiles 136, discussed in reference to environment 100 of FIG. 1. In this regard, environment 200 displays components and processing operations to utilize estimated quantile values in fraud detection and other intelligent decision-making systems. Thus, the components and operations described in environment 200 of FIG. 2 may be provided by quantile calculation application 140 and/or utilized by fraud detection application 132 from environment 100. In this regard, profile(s) 136 are utilized to reduce data set and storage size, which conserves data storage resources and/or processing time during fraud detection.

For example, in environment 100, transaction data 122 may be collected over a time period for capturing data from one or more transaction processors and/or resources. Transaction data 122 may be initially cached and/or temporarily stored as a vesting data set prior to data persistence in a longer-term database or data warehouse. Further, the data values in transaction data 122 may be refined so that the data values and corresponding metadata are more easily processed by a corresponding system, service, and/or application. At the end or expiration of the time period of the vesting data set, transaction data is processed with profiles 136 for persistence as real values or quantile marker values for profiles 136 in one or more databases or data warehouses associated with service provider server 130.

In this regard, profiles 136 may be used with the fraud detection system in environment 200. Transaction data 122 in environment 200 may correspond to the same or similar data used to establish profiles 136, such as by having similar transaction parameters, values, metadata, etc. In environment 200, transaction data 122 is initially provided as input to a main feed for the fraud detection system and/or application, such as fraud detection application 132. When performing fraud detection, a validation may occur of transaction data 122 at step 202, which is performed using scoring rules. This may correspond to initially validating transaction data 122 as valid and corresponding to proper transaction data. At step 204, data enrichments of transaction data 122 occur to further enrich transaction data 122 with additional data necessary for fraud detection. Data enrichments allow for merging other data (e.g., third-party data, detected data during transaction processing, secondary transaction data, etc.) with transaction data 122. For example, enrichments performed at step 204 may include a session enrichment with an IP address, a transfer enrichment with a payee key, or further data enrichments that provide additional data and metadata (e.g., when not included with the original data but known from the original data) with transaction data 122.

At step 206, data is prepared for fraud detection, such as by fetching profiles 136 for one or more transaction entities in the transaction. Profiles 136 may be fetched from a database or data warehouse used to store data used in fraud detection and risk analysis. Other intelligent systems may employ other rules, ML or AI models and engines, and the like for intelligent decision-making and classification. In this regard, profiles 136 include data necessary to calculate or retrieve a median, a quantile measure, a MAD/QAD, or other statistical or analytical measurement used by intelligent systems. For example, profiles 136 may include real values where below a threshold number (e.g., twenty data values) or may instead include median or quantile marker values that estimate a median or quantile value through the algorithms and data processing operations described herein.

At step 208, main fraud detection is performed using the enriched transaction data with profiles 136. This may include calculating or retrieving any necessary measures or keys (where sometimes the absence of a key for a specific entity in the profile may be the indication that something risky is happening, for example: Bob has never paid Alice in the past, this is the first time, so therefore Alice's key is not in the corresponding profile for Bob) from profiles 136 for the corresponding fraud detection and using such measures to determine if a transaction indicates fraud. Generally, in the detection logic, the values of the current detected transaction, such as the transaction amount, counter entity key, destination country and other values, are being compared (arithmetically or otherwise, like the example above) with the aggregated values in the entity's profiles. The aggregated values in the entity's profiles may be computed from previous transactions (that were updated in the profiles after they happened to continue the establishment of the entity's common behavior) and represent the common behavior of the entity in terms of activity and values. As an example, a median of the entity's transactions via mobile peer-to-peer (P2P) may be $50. A transaction of $3,600 may be initiated suddenly and without notice to Alice, whom the entity has not previously sent money. When fetching the median $50 from the profile and the fact that Alice is not a previous counter entity in the profile for this entity, the fraud detection entity may determine that the transaction indicates potential fraud. This may include declining the transaction, requiring an authentication step-up or other heightened security, and/or notifying the entity, the entity's financial institution, or an authority. In another example, a current account balance may be $500, and the current transaction amount may be $500. Here, the $90^{th}\%$ quantile of amount to balance ratio is 0.25, meaning that for 90% of the transactions initiated using the account, the ratio is 0.25 of the transaction amount to the account balance. Thus, the current ratio of 1 ($500/$500) is risky, because 90% of the time transactions processed for the account is below that ratio of 0.25.

Thereafter, during step 210, profiles are reviewed, such as one or more of profiles 136, in order to determine if a profile update process 212 is required to be executed with transaction data 122. This process may correspond to operations to utilize the captured data values for transaction data 122 and determine one or more of profiles 136 for updating based on the captured data values. For example, the data values may correspond to one or more entities and transactions processed by those entities. For each entity, a corresponding vesting data set may be generated during a recurring time period and stored for periodic processing with the entities profile. The vesting data set may include real values or quantile marker values depending on a number of real values being added to the vesting data set. For example, for an entity, data values may be captured over a time period and added to a history of the entity in the vesting data set. If below a threshold (e.g., twenty, however, any threshold number over the number of quantile value markers may be selected), the real values are added and stored without transformation or calculation to quantile value markers. However, where the real values are equal to the threshold, the previous values may be ln-transformed, calculated into quantile value markers with the new ln-transformed values and merged using a marker algorithm and merge operation. The process of generating a data set having real values or quantile value markers for quantile value estimation is described in further detail with regard to FIG. 3.

Thus, at step 210, if an entity has one or more data values or other data records in a vesting data set for the entity, their corresponding profile may be reviewed and determined that profile update process 212 is required for updating a historical data set in the profile with the vesting data set. If at step 210, profile update process 210 is determined to be required for one or more of profiles 136, the vesting data set and an identifier or information for the corresponding profile is entered to queues 214. Queues 214 may correspond to data processing queues, whereby processing jobs and the corresponding data for processing is queued for execution at a specific time and/or upon maturation or expiration of a processing job wait time. This wait time may correspond to the time interval or time period of capturing data values for transaction data 122 or may occur after capturing of the data values for one or more vesting data sets (e.g., at a time of day designated for data processing of vesting data sets and profiles 136, such as when system resources are available).

Queues 214 may then be accessed by profiles queue listener 216, which may access profiles 136 from a profiles database and process the vesting data set(s) with one or more of profiles 136. For example, profiles queue listener 216 may interact with quantile calculation application 140 to determine whether real values are shared between the data set and below a threshold (e.g., twenty, however, any threshold number over the number of quantile value markers may be selected). If so, profile queue listener 216 may determine that a first merging operation to merge the real data values is required. However, if both sets include quantile value markers, a second merge operation using a marker algorithm and marker value calculation process may be required. Further, if one set includes real values and the other includes quantile value markers, the real values may be merged with the quantile value markers using a third merge operation using the marker algorithm and marker value calculation process. The process of processing, transforming, and/or merging data values between a vesting data set and a historical data set in a profile of an entity is discussed in more detail with regard to FIG. 4.

Data Flow and Processing Techniques

Figure 3:
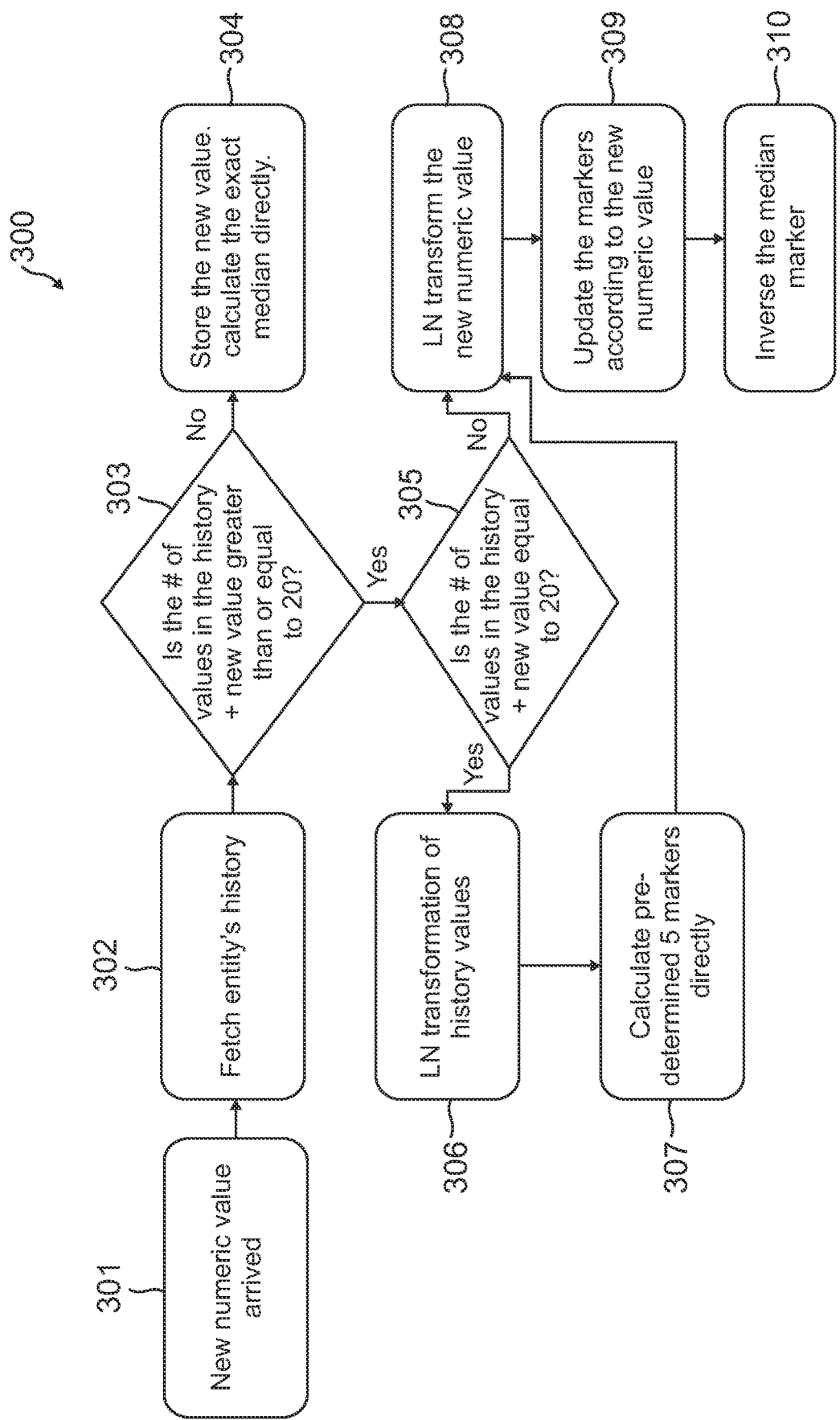
FIG. 3 is a simplified diagram of a flowchart for estimating quantile values and other measures from data sets of values according to some embodiments.

FIG. 3 is a simplified diagram of a flowchart for estimating quantile values and other measures from data sets of values according to some embodiments. In some embodiments, generating the quantile values and other measures described in flowchart 300 of FIG. 3 can be implemented and performed using service provider server 130. In this regard, in flowchart 300, quantile calculation application 140 may perform and/or execute quantile calculation processes 142 to provide data sets of data values based on a corresponding number of real values or predetermined number of quantile value markers.

Flowchart 300 includes individual cells corresponding to the different operations performed when capturing data values and creating a data set of either real values or quantile value markers. For example, flowchart 300 may be executed by quantile calculation application 140 when creating a vesting data set, which may be used for determining median or quantile measures. In cell 301, a new value arrives, such as when listening for transaction data from a transaction processor. This new value may correspond to an extracted or refined data value from a transaction and may include an identifier or other information identifying an entity. Thus, at cell 302, an entity's history is fetched. This may correspond to the history for the new numeric value, such as a shorter-term vesting data set and not a longer-term historical data set in a quantile value profile. However, where numeric values may be directly stored to the profile and/or only a vesting data set is used, the entity's history may only include the singular data set.

At cell 303, it is determined if the number of values in the history plus the new value is greater than or equal to twenty. Twenty is used as the threshold as discussed herein, however, other values may be utilized. For example, any value over the number of selected quantile value markers may be used, however, higher thresholds increase data storage size. Thus, accuracy and performance and available data storage may dictate the selection of the threshold. If the number is less than the threshold of twenty, then at cell 304, the new value is stored directly to the data set and the median (or another quantile measure) may be calculated directly. However, if not, at cell 305, it is determined whether the number of values in the history plus the new value is equal to twenty.

If equal to twenty, at cell 306, the values in the history, and not the new value, are ln-transformed into their natural log values. For example, a historical transaction value of 456 and 7,896 may be transformed to ln(456)=6.122 and ln(7896)=8.974, respectively. Using these ln-transformed values, at cell 307, the predetermined markers are calculated directly. For example, where five predetermined marker values (e.g., 0%(min), 25%, 50%(median), 75%, and 100% (max)), five markers values may be calculated using a marker algorithm and marker value calculation process. In some embodiments, eleven marker values may be selected for performance with fraud detection systems, such as from 0-100% and 10% intervals. Another number of marker values may be predetermined instead, e.g., six marker values, such as none, every 20%, and maximum. Calculation of markers may be performed using a marker algorithm, such as the one described in "The $P^2$ Algorithm for Dynamic Calculation of Quantiles and Histograms Without Storing Observations" by Raj Jain and Emrich Chlamtac, published Oct. 1985 in "Communications of the ACM" (hereinafter "Jain et al."), and "Fast Computation of the Median by Successive Binning" by Ryan J. Tibshirani, published Jun. 20, 2008 (hereinafter "Tibshirani"), the entire contents of which are hereby incorporated herein by express reference thereto. An exemplary marker algorithm may be found at Box 1 of page 1079 in Jain et al. For example, such algorithm may be as follows:

Equation 1:
$P^2$ Algorithm: To calculate the p - quantile of $\{x_1, \ldots, x_n\}$ A. Initialization: Sort the first five observations
$\{x_1, x_2, x_3, x_4, x_5\}$ and set
Marker heights $q_i \leftarrow x_{(i)}$; i = ..., 5
Marker positions $n_i \leftarrow i$; i =..., 5
Desired marker positions
$n_1' \leftarrow 1$;   $n_2' \leftarrow 1 + 2p$;   $n_3' \leftarrow 1 + 4p$;
   $n_4' \leftarrow 3 + 2p$;   $n_5' \leftarrow 5$;
Note that $n_1'$ are real variables, while $n_i$ are integers.
To reduce CPU overhead, calculate and store the increment $dn_1'$ in the desired marker positions:
$dn_1' \leftarrow 0$;   $dn_2' \leftarrow p/2$;   $dn_3' \leftarrow P$;
   $dn_4' \leftarrow (1 + p)/2$;   $dn_5' \leftarrow 1$;

-continued

Equation 1:
$P^2$ Algorithm: To calculate the p - quantile of $\{x_1, \ldots, x_n\}$ B.  For each subsequent observation $x_j$, $j \geq 6$, , perform the following:
    1.  Find cell k such that $q_k \leq x_j < q_{k+1}$ and adjust extreme values $q_1$ and $q_5$ if necessary, that is,
        CASE of $x_j$ $[x_j < q_1]$        $q_1 \leftarrow x_j; k \leftarrow 1;$
        $[q_1 \leq x_j < q_2]$    $k \leftarrow 1;$
        $[q_2 \leq x_j < q_3]$    $k \leftarrow 2;$
        $[q_3 \leq x_j < q_4]$    $k \leftarrow 3;$
        $[q_4 \leq x_j < q_5]$    $k \leftarrow 4;$
        $[q_5 < x_j]$        $q_5 \leftarrow x_j; k \leftarrow 4;$ END CASE;
    2.  Increment positions of markers k + 1 through 5
        $n_i \leftarrow n_i + 1$   $i = k, \ldots, 5$
        Update desired positions for all markers:
        $n_i \leftarrow n_i + dn_i$   $i = 1, \ldots, 5$
    3.  Adjust heights of markers 2-4 if necessary:
        For i = 2 TO 4 DO
            BEGIN
                IF $\{(d_i \geq 1$ and $n_{i+1} - n_i > 1)$ or
                    $(d_i \leq -1$ and $n_{i-1} - n_i < -1)\}$ or
                BEGIN
                    $d_i \leftarrow \text{sign}(d_i)$
                    Try adjusting $q_i$ using $P^2$ formula:
                    $q_i' \leftarrow q_i$ from parabolic formula
                    IF $\{q_{i-1} < q_i' < q_{i+1}\}$
                    THEN $q_1 \leftarrow q_1$
                    ELSE use linear formula:
                        $q_1 \leftarrow q_1$ from linear formula;
                        $n_i \leftarrow n_i + d_i,$
                END IF;
            END DO;
C.  Return $q_3$ as the current estimate of P - quantile For example, with reference to FIG. 5, at cell 307 a marker algorithm is implemented with operations for execution and determination of the quantile marker values, including a median marker value. The five markers are created from five values from the data set, such as five initial values. Each value may have a corresponding marker, as shown in data tables 500 of FIG. 5. In data value table 502, markers 504 (e.g., 1-5) are shown with corresponding data values from the data set, where marker 1 for percentile 0% is 0, marker 2 for percentile 25% is 15, marker 3 for percentile 50% (median) is 540, marker 4 for percentile 75% is 1,547, and marker 5 for percentile 100% is 5,541. Although selection of the lowest and highest value may be initially performed, other values may be selected, and the marker algorithm may compensate by placing additional values at different positions based on different heights.

In markers table 510, each marker corresponds to a percentile 512 from 0-100%, such as for five markers (e.g., 0%(min), 25%, 50%(median), 75%, and 100%(max)). Each marker further has a corresponding marker number 514 as shown from 1-5, which is the number of markers for data value table 502 (e.g., percentiles or quantiles selected). Each marker includes a position 516 from 1-5 in markers table 510, which is the corresponding position in increasing order from left to right. Further, each of the markers have a height 518, which corresponds to the initial or ln-transformed data value of that marker. Thus, markers table 510 may be used when adding and merging additional data values for calculating quantile marker values and estimating quantile values for a data set.

For example, when a new numeric data value is added (e.g., ID=6), the markers position 516 and height 518 change in markers table 510, however, the percentile 512 and marker number 514 do not. The new data value is added based on its value or height 518, such as be inserting between a lower and higher height. For example, if a data value for ID=6 is 350, ID=6 is inserted between percentile 512 for 25% and 50% and marker numbers 514 of 2 and 3. Thus, marker number 514 having ID=2 with a height 15 has the position 516 remain the same, but marker number 514 having ID=3 with a height of 540 has position 516 change to 4. Using the marker algorithm and marker value calculation process, it may be assumed that for any new numeric value, position 516 of the markers that are higher than the new numeric value should increase (because now they are higher by +1 value).

Now that marker numbers 514 exceed five (in the example with five marker values), to adjust position 516 and height 518, a marker algorithm and marker value calculation process is executed. For example, it may be assumed that between any 3 markers (e.g. 2, 3, 4) there is a unique parabola in the form of $aX^2+bX+c$. If any of the markers' position 516 or height 518 may be adjusted, the parabola may be used to adjust position 516 and/or height 518 accordingly in order to determine and estimate quantile values for percentiles 512. Thus, a marker algorithm may be applied, such as the one described in Jain et al. This process may be applied to all of the additional data values to merge those data values with the quantile marker values and estimate the quantile marker values. Once all the marker data values have been estimated using the marker algorithm, the remaining data set of the historical data values may include the five (or other predetermined number) corresponding quantile marker values.

After the predetermined markers are calculated, at cell 308, the new numeric value is ln-transformed. This allows the new data value to be merged with the quantile marker values. In other embodiments, cell 305 may proceed directly to cell 308 where the number of data values is higher than the threshold of twenty. In such embodiments, the quantile marker values may be previously determined and flowchart 300 may proceed directly from cell 305 to cell 308. This may be done using the marker algorithm and as described above when adding a new value to the quantile marker values for the selected quantiles. At cell 309, the markers are updated according to the new numeric data value. However, the data values for each quantile marker is now expressed in its corresponding natural log form. Thus, at cell 310, the median marker value or other quantile marker value (e.g., having a corresponding data value expressed in natural log form), may be inversed from the natural log (ln-inversed) and a corresponding median or other quantile measure may be used in fraud detection and risk assessment systems.

Figure 4:
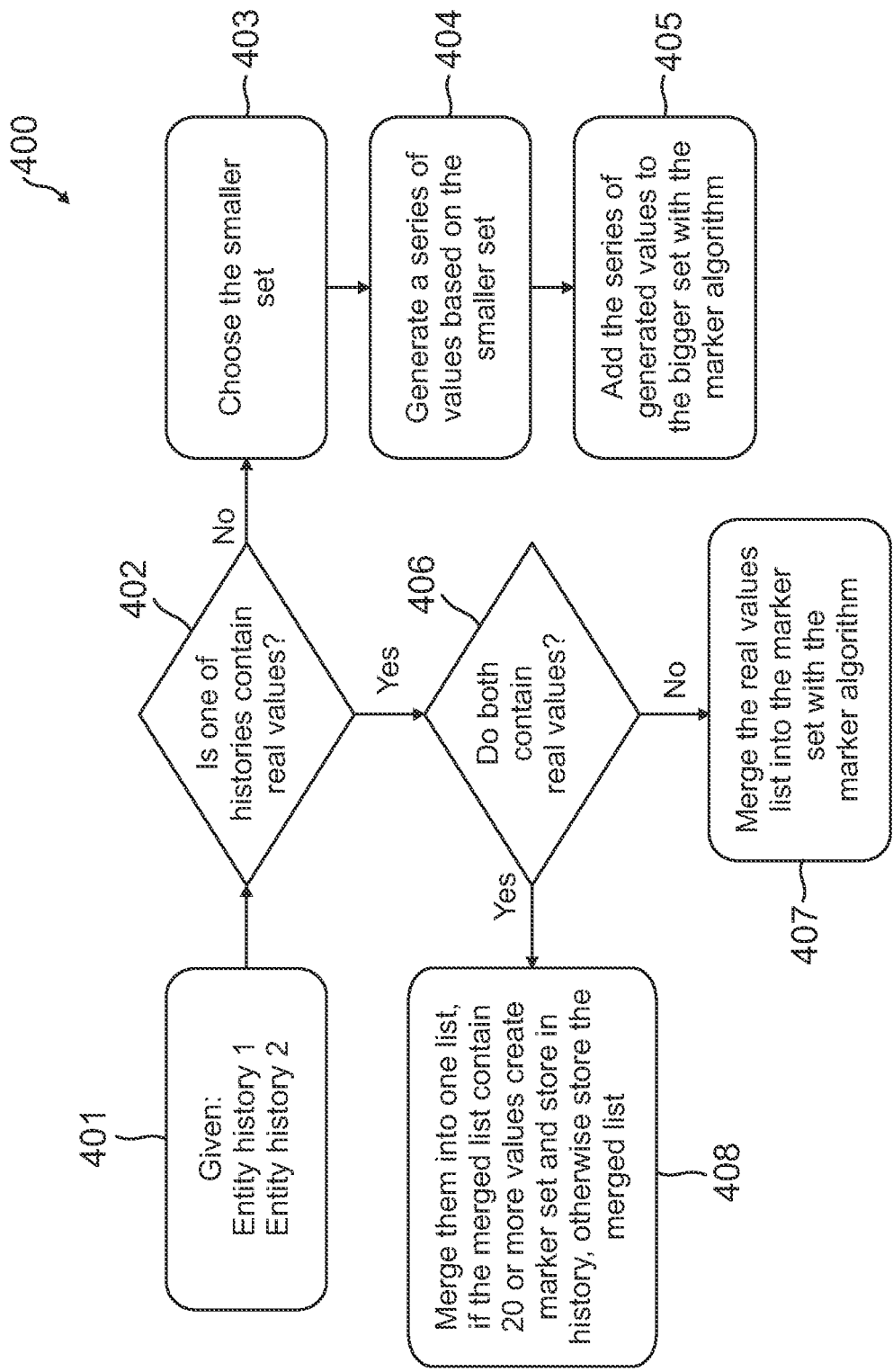
FIG. 4 is a simplified diagram of a flowchart for merging real data values and/or quantile value markers when updating a quantile value profile with different entity histories according to some embodiments.
Figure 5:
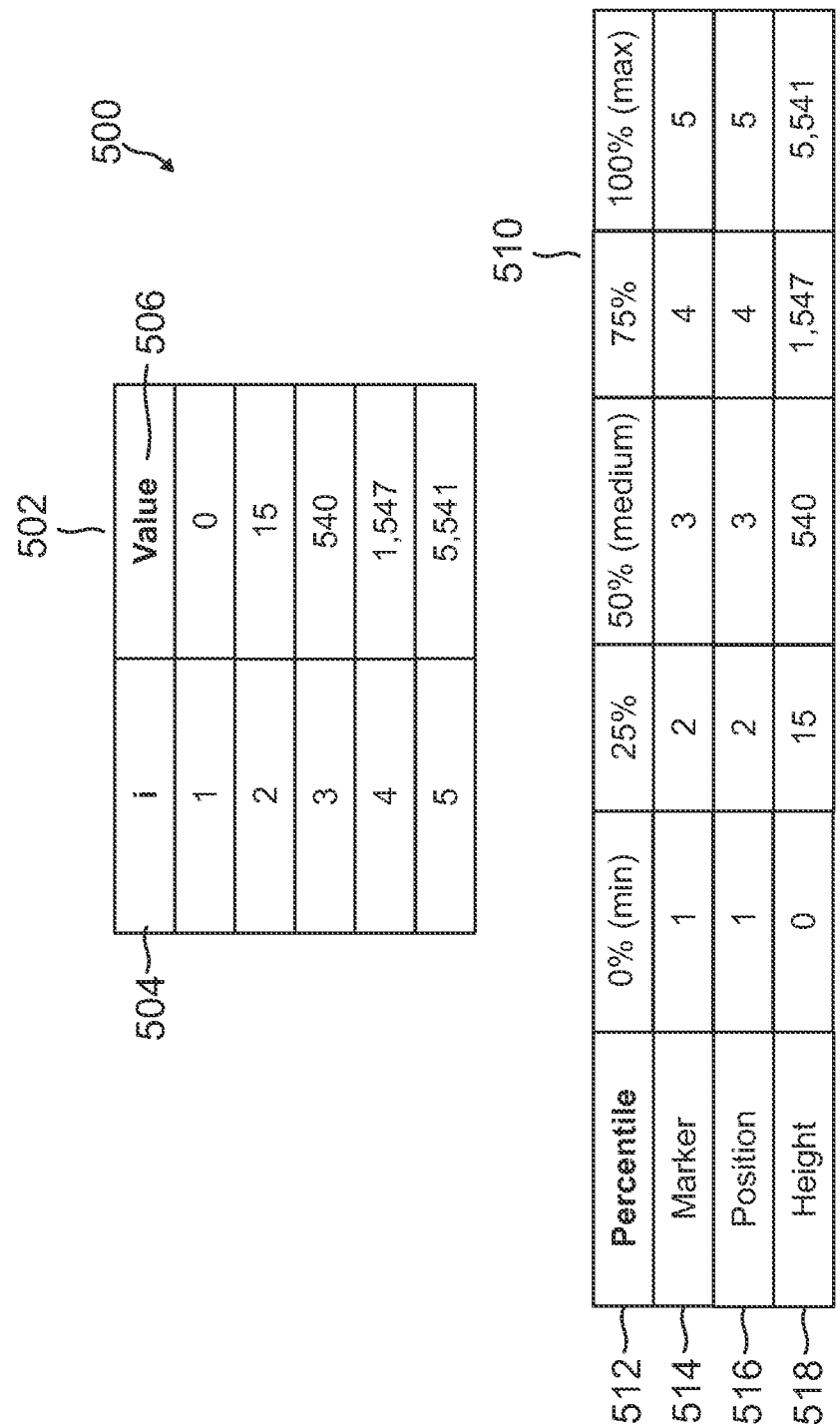
FIG. 5 is a simplified diagram of data tables of estimated quantile values used for quantile value markers in a quantile value profile according to some embodiments.

FIG. 4 is a simplified diagram of a flowchart for merging real data values and/or quantile value markers when updating a quantile value profile with different entity histories according to some embodiments. In some embodiments, merging data sets having real values or quantile value markers (e.g., estimated quantile values at certain quantile percentile values) described in flowchart 400 of FIG. 4 can be implemented and performed using service provider server 130. In this regard, in flowchart 400, quantile calculation application 140 may perform and/or execute quantile calculation processes 142 to provide data sets of data values and merge such data sets based on a corresponding number of real values or predetermined number of quantile value markers.

Flowchart 400 includes individual cells corresponding to the different operations performed when accessing different data sets, such as a vesting data set and a historical data set (e.g., one stored in a long-term entity profile). For example, flowchart 400 may be executed by quantile calculation application 140 when determining a profile merge is required. At cell 401, a first entity history and a second entity history are given. The two entity histories may have a different capture time periods and/or different data such that merger of the data is required for median and quantile value calculations. For example, one entity history may correspond to a daily or other time period vesting data set that requires merging and persistence with a historical data set for an entity that is stored with a profile of that entity, such as a quantile value profile for different measures tracked for the user.

At cell 402, it is determined if one of the histories has real values. The histories may individually have real data values or alternatively quantile marker values (e.g., estimated data values for percentile markers, median, or other measure), but not both. If neither have real values, at cell 403, the smaller set is chosen. The smaller set corresponds to the set with the highest quantile (e.g., percentile or other marker) having the smaller quantile data value of the two. For example, the smaller may be chosen between a maximum position from a history A and a maximum position from a history B. For example, with five marker values in each of the profiles (e.g., 1-5), in the $5^{th}$ marker value spot, one set may have 55 and the other 68. The set having 55 is chosen in cell 403.

At cell 404, a series of values based on the smaller set is generated. The series of values may be based on the following algorithms so that the series of values may be merged with the larger data set. For example, in order to find the coefficients of the parabola in the form of $Y=aX^2+bX+c$ that passes through markers 1, 2, and 3, an operation of the merging process may solve the following three equations: Height1=a*position1$^2$+b*position1+c; Height2=a*position2$^2$+b*position2+c; and Height3=a*position3$^2$+b*position3+c. For example, consider the marker set where position 1=1, position 2=17, position 3=33, position 4=49, and position 5=65. Once the coefficients are solved, the values may be generated using the coefficients by placing X=1 to 17. This provides all values between markers 1 and 2.

Similarly, to determine values between markers 2 and 3 and between markers 3 and 4, the coefficients of the parabola in the form of $Y=aX^2+bX+c$ that passes through markers 2, 3, and 4 may be determined by solving the following three equations: Height2=a*position2$^2$+b*position2+c; Height3=a*position3$^2$+b*position3+c; and Height4=a*position4$^2$+b*position4+c. Once the coefficients are solved, the values between markers 2 and 3 and between markers 3 and 4 by placing X=18 to 49. Lastly, to determine values between markers 4 and 5, the coefficients of the parabola in the form of $Y=aX^2+bX+c$ that passes through markers 3, 4 and 5 may be determined by solving the following three equations: Height3=a*position3$^2$+b*position3+c; Height4=a*position4$^2$+b*position4+c; and Height5=a*position5$^2$+b*position5+c. Once the coefficients are solved, the values between markers 4 and 5 by placing X=50 to 65.

Once the values are determined, the series of generated values are added to the bigger set. This may include using and applying the selected marker algorithm to the merged data sets to estimate the data values for each marker and corresponding percentile. This marker value merge and calculation process allows for the data sets having quantile marker values to be merged. However, if one of the histories has real values, at cell 406, it is determined if both contain real value. If both do not contain real values then one set (e.g., the vesting data set or the historical data set of a quantile value profile) has real values and the other has quantile marker values. When this occurs, at cell 407, the real values in the list or data set is merged into the marker set with the marker algorithm. This may be similar to using the generated values from cells 404/405 to merge real values with quantile marker values using the marker algorithm. However, when both sets include real values, cell 406 proceeds to cell 408, where the real values are merged into one list. If the list contains less than the threshold number of data values, the set may be retained as real values. However, if meeting or exceeding the threshold (e.g., twenty data values), a marker data set is determined by calculating quantile marker values using the marker algorithm as discussed in FIG. 3.

Figure 6:
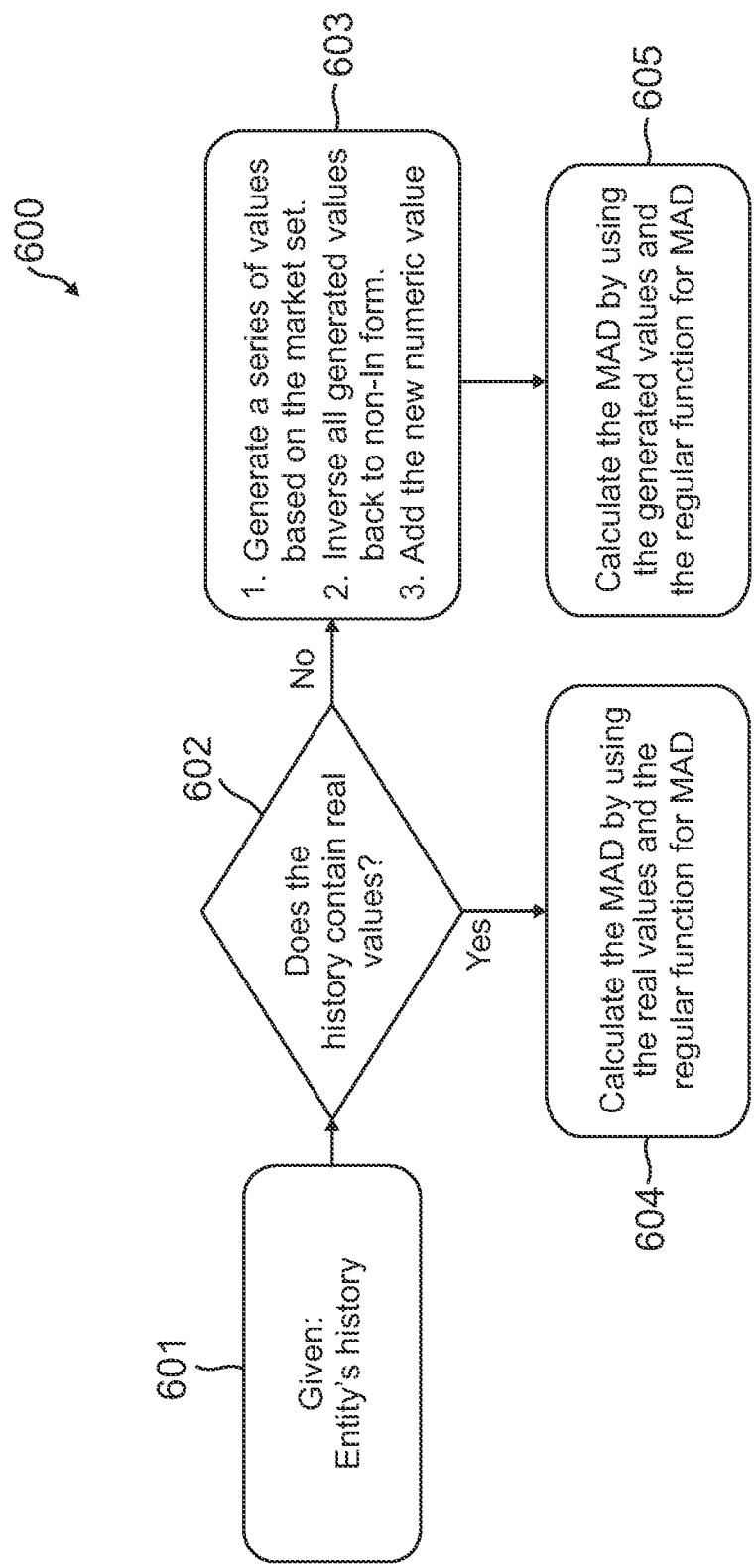
FIG. 6 is a simplified diagram of a flowchart for calculating median and quantile absolute deviations for a quantile value profile according to some embodiments.

FIG. 6 is a simplified diagram of a flowchart for calculating median and quantile absolute deviations for a quantile value profile according to some embodiments. In some embodiments, after generating and/or merging data sets having real values or quantile value markers (e.g., estimated quantile values at certain quantile percentile values), a MAD and QAD measure may be required to be calculated. A MAD measure may correspond to a Median Absolute Deviation, which is the median of the absolute deviations from the current median. Similarly, a QAD may be a corresponding measure from a particular quantile, such as 22%, 47%, or the like. Such processes described in flowchart 600 of FIG. 6 to calculate MAD and QAD measures can be implemented and performed using service provider server 130. In this regard, in flowchart 600, quantile calculation application 140 may perform and/or execute quantile calculation processes 142 to determine these measures.

Flowchart 600 includes individual cells corresponding to the different operations performed when accessing different data sets to calculate a MAD or QAD measure, such as a vesting data set and a historical data set (e.g., one stored in a long-term entity profile). Flowchart 600 begins at cell 601 where an entity's history is given, which may correspond to a quantile value profile having one or more data sets. These data sets may be used for fraud detection and other automated and/or intelligent decision-making processes. For example, the data sets may be used to identify and/or prevent fraudulent transactions. Based on the entity's history, at cell 602, it is determined if the history contains real values.

If so, at cell 603, three steps are performed in order to generate values that may be used in calculating a MAD or QAD. At an initial step, a series of values based on the quantile marker values in entity's history are determined. This is performed in a similar manner to the generation of values described with respect to cell 404 in flowchart 400 of FIG. 4 above. For example, for a five-marker data set, the same or similar equations may be used to solve for coefficients of the parabola in the form of $Y=aX^2+bX+c$. Thereafter, the data values may be solved for using the same or similar processes. Once the data values are solved for, at the next step, the data values are inversed back to non-ln form so they are no longer the natural logs of the data values. At the last step, the new numeric value(s) is/are added to the series.

At cell 604, the MAD or QAD is calculated using the generated values and a regular function for MAD or QAD. The function may be processed by sorting the values in order and calculating the median value. The absolute deviation for the median for each value is determined by taking the absolute value of: (the data value minus the median). These are maintained in the order of the data values, and the MAD is the median of this values in order. For example, by sorting 578, 777, 874, and 85796 in order, the median is (777+874)/2=825.5. The absolute deviation from the median for each value in order is |1578−825.5|=247.5, |777−825.5|=48.5, |874−825.5|=48.5, and |85796−825.5|=84970.5. In original order these are 247.5, 48.5, 48.5, 84970.5. After sorting by absolute deviation, these are 48.5, 48.5, 247.5, and 84970.5. Thus, by taking the two middle values, the MAD is (48.5+247.5)/2=148. If instead the history includes real values, there is no need to generate additional values and cell 602 instead proceeds to cell 604 where the MAD is calculated using the real values and the regular function for MAD.

Figure 7:
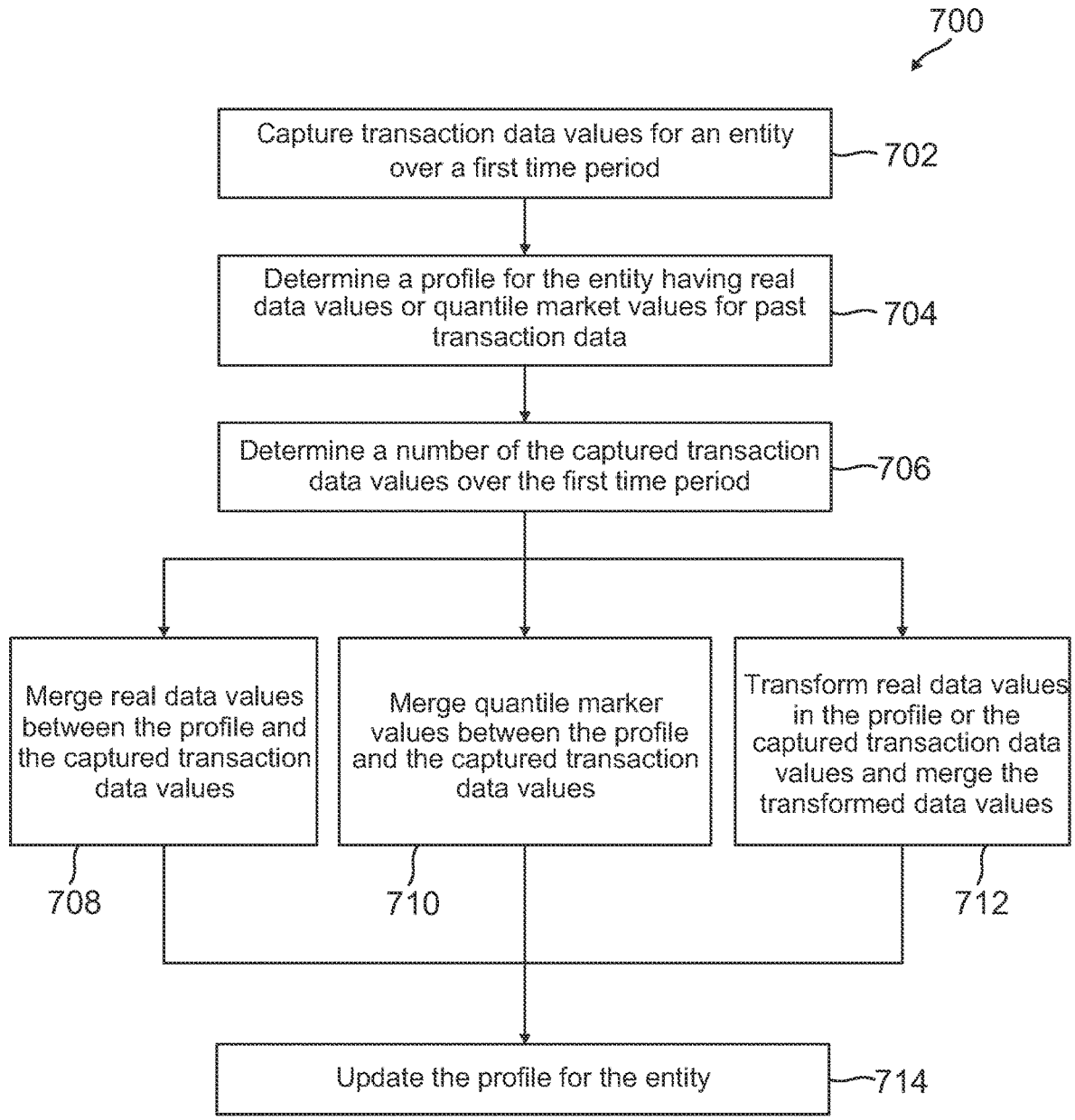
FIG. 7 is a simplified diagram of a method for estimating quantile values for reduced memory and/or storage utilization and faster processing time in fraud detection and other intelligent decision-making systems according to some embodiments.

FIG. 7 is a simplified diagram of a method for estimating quantile values for reduced memory and/or storage utilization and faster processing time in fraud detection and other intelligent decision-making systems according to some embodiments. Note that one or more steps, processes, and methods described herein of method 700 may be omitted, performed in a different sequence, or combined as desired or appropriate. In some embodiments, generating quantile value profiles based on estimating quantile values described in method 700 of FIG. 7 can be implemented and performed using service provider server 130. One or more of the steps 702-714 of method 700 may be implemented, at least in part, in the form of executable code stored on non-transitory, tangible, machine-readable media that when run by one or more processors may cause the one or more processors to perform one or more of the steps 702-714. In some embodiments, method 700 can be performed by one or more computing systems in environment 100 of FIG. 1.

At step 702 of method 700, transaction data values are captured for an entity over a first time period. This may occur by listening to one or more transaction processors or transaction data processing entities (e.g., end users, merchants, organizations, businesses, financial institutions, and the like) and capturing detected data. The transaction data may also be captured when received for a fraud detection and/or risk analysis system. When capturing the transaction data, the transaction data may be accumulated into a vesting data set or other data set that serves as a history for an entity. The history may be temporary, semi-permanent, and/or permanent. Where not permanent, the vesting data set may be accumulated for later merging with another data set, such as historical data set in a quantile value profile.

At step 704 a profile, such as a quantile value profile, for the entity having real data values or quantile marker values for past transactions data is determined. This quantile value profile may include real data values where such data values do not meet or exceed the predetermined threshold. However, if this occurs, the quantile value profile instead may include markers for certain percentiles or other measure, where quantile marker values may be associated with these markers, such as a median (50%) marker having a data value from previous real data values. At step 706, a number of the captured transaction data values over the first time period is determined. Depending on the number of captured transaction data values, either real data values or quantile marker values may reside in the vesting data set or other entity history for the first time period. In various embodiments, where a number of the captured transaction data values may meet or exceed a threshold number of data values, flowchart 300 from FIG. 3 may be utilized to convert those real data values to quantile marker values for different quantiles or markers.

Depending on whether the data set for the first time period and the data set in the profile include real data values or estimated quantile data values for predetermined markers, method 700 may proceed to one of steps 708, 710, or 712. For example, at step 708, real data values between the profile and the captured transaction data values are merged. This may occur when both data sets include real values. However, if after merging, a number of the data values meets or exceeds the threshold data values, then the marker algorithm and one or more processes may be executed to convert the data values to quantile marker values for the predetermined markers.

At step 710, quantile marker values between the profile and the captured transaction data values is merged. This may occur where both data sets include quantile marker values for the predetermined markers. At step 712, real data values in the profile or captured transaction data values are transformed, such as through ln-transformation, and then used to merge with quantile marker values in the other data set. This may occur where one data set includes real data values and the other data set includes quantile marker values. In order to perform the merging operations of step 710 or step 712, flowchart 400 from FIG. 4 may be utilized to merge data sets where one or more include quantile marker values.

Based on the executed merge operation, at step 714, the profile for the entity is updated. This may include persisting the profile to storage for use by a fraud detection or other intelligent data processing and decision-making system. Further, the profile may be updated with a timestamp or other metadata indicating the last update.

As discussed above and further emphasized here, FIGS. 1, 2, 3, 4, 5, 6, and 7 are merely examples of service provider server 130 and corresponding methods for estimating quantile values for reduced memory and/or storage utilization and faster processing time in fraud detection and other intelligent decision-making systems, which examples should not be used to unduly limit the scope of the claims. One of ordinary skill in the art would recognize many variations, alternatives, and modifications.

Figure 8:
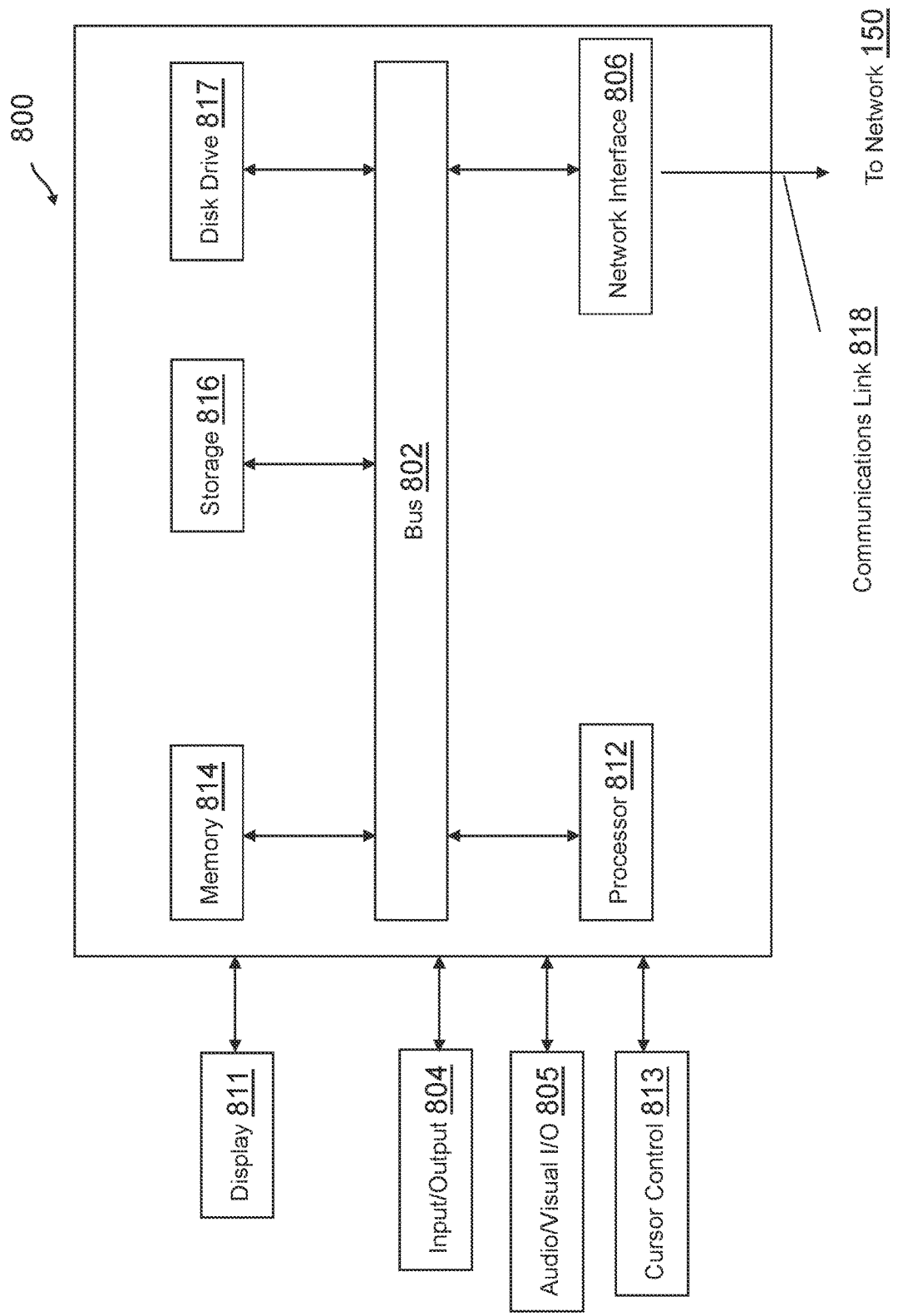
FIG. 8 is a simplified diagram of a computing device according to some embodiments.

FIG. 8 is a block diagram of a computer system suitable for implementing one or more components in FIGS. 1 and/or 2, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 800 in a manner as follows.

Computer system 800 includes a bus 802 or other communication mechanism for communicating information data, signals, and information between various components of computer system 800. Components include an input/output (I/O) component 804 that processes a user action, such as selecting keys from a keypad/keyboard, selecting one or more buttons, images, or links, and/or moving one or more images, etc., and sends a corresponding signal to bus 802. I/O component 804 may also include an output component, such as a display 811 and a cursor control 813 (such as a keyboard, keypad, mouse, etc.). An optional audio input/output component 805 may also be included to allow a user to use voice for inputting information by converting audio signals. Audio I/O component 805 may allow the user to hear audio. A transceiver or network interface 806 transmits and receives signals between computer system 800 and other devices, such as another communication device, service device, or a service provider server via network 150. In one embodiment, the transmission is wireless, although other transmission mediums and methods may also be suitable. One or more processors 812, which can be a micro-controller, digital signal processor (DSP), or other processing component, processes these various signals, such as for display on computer system 800 or transmission to other devices via a communication link 818. Processor(s) 812 may also control transmission of information, such as cookies or IP addresses, to other devices.

Components of computer system 800 also include a system memory component 814 (e.g., RAM), a static storage component 816 (e.g., ROM), and/or a disk drive 817. Computer system 800 performs specific operations by processor(s) 812 and other components by executing one or more sequences of instructions contained in system memory component 814. Logic may be encoded in a computer readable medium, which may refer to any medium that participates in providing instructions to processor(s) 812 for execution. Such a medium may take many forms, including but not limited to, non-volatile media, volatile media, and transmission media. In various embodiments, non-volatile media includes optical or magnetic disks, volatile media includes dynamic memory, such as system memory component 814, and transmission media includes coaxial cables, copper wire, and fiber optics, including wires that comprise bus 802. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 800. In various other embodiments of the present disclosure, a plurality of computer systems 800 coupled by communication link 818 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications of the foregoing disclosure. Thus, the scope of the present application should be limited only by the following claims, and it is appropriate that the claims be construed broadly and in a manner consistent with the scope of the embodiments disclosed herein.

What is claimed is:

1. A fraud detection system configured to estimate quantile values for fraud assessments, the fraud detection system comprising:
   a processor and a computer readable medium operably coupled thereto, the computer readable medium comprising a plurality of instructions stored in association therewith that are accessible to, and executable by, the processor, to perform quantile value estimation operations which comprise:
   determining a first time period associated with one or more first data values that are designated for updating a quantile value profile usable to perform the fraud assessments, wherein the quantile value profile is associated with an entity;

capturing, over the first time period, the one or more first data values for the quantile value profile, wherein the quantile value profile is further associated with a second time period and comprises one of (a) real values for one or more second data values for the entity over the second time period or (b) a first plurality of quantile marker values calculated from the one or more second data values;

at an end of the first time period, accessing the quantile value profile for the entity;

determining a first number of the one or more first data values over the first time period;

based on the first number of the one or more first data values and the one of the real values or the first plurality of quantile marker values in the quantile value profile, performing one of a first merge operation, a second merge operation, or a third merge operation on the one or more first data values captured over the first time period with the one of the real values or the first plurality of quantile marker values in the quantile value profile, wherein the performing the second merge operation and the third merge operation includes:
  computing intersections of a parabolic equation between heights and positions of the one or more first data values, the one of the real values, or a combination thereof, and
  determining coefficients of the parabolic equation based on the intersections, wherein an output of the parabolic equation comprises different quantile value markers that reduce the number of one of the one or more first data values or the one of the real values, and wherein the coefficients for a parabola of the parabolic equation that intersects different ones of the first plurality of quantile marker values and a second plurality of quantile marker values associated with the quantile value profile based on the intersections;

after the second time period, performing a profile update for the quantile value profile by:
  determining that a data storage size of the quantile value profile requires a reduction that reduces the quantile value profile to a minimum set of quantile value markers associated with the identified parabolic equation having the determined coefficients, and
  reducing the data storage size of the quantile value profile using the third merge operation; and performing the fraud assessments using the quantile value profile having the profile update, wherein the minimum set of quantile value markers in the quantile value profile are used to replace past data values processed by an intelligent fraud detection engine for the fraud assessments.

2. The fraud detection system of claim 1, wherein:
the first merge operation comprises merging the one or more first data values with the real values in the quantile value profile,
the second merge operation comprises merging the one or more first data values with the first plurality of quantile marker values using a marker value calculation process including the identified parabolic equation having the determined coefficients, and
the third merge operation further comprises transforming the one or more first data values into the second plurality of quantile marker values and merging the first plurality of quantile marker values with the second plurality of quantile marker values using the marker value calculation process including the identified parabolic equation having the determined coefficients.

3. The fraud detection system of claim 2, wherein the second merge operation and the third merge operation each further comprise performing a natural log transformation on the one or more first data values prior to merging or transforming the one or more first data values.

4. The fraud detection system of claim 2, wherein the first plurality of quantile marker values and the second plurality of quantile marker values are associated with five to eleven marker quantiles for the marker value calculation process.

5. The fraud detection system of claim 1, wherein the one or more first data values and the one or more second data values are associated with at least one of transaction amounts, dates, scores, counts, true and/or false states, ordinal categories, balances, ratios, alpha-numeric strings, serial numbers, list sizes, or values sorted in a descending order, and wherein the intelligent fraud detection engine comprises one or more risk models for the fraud assessments.

6. The fraud detection system of claim 1, wherein the first time period and the second time period comprise one of an hour, a day, a week, a month, a quarter, or a year.

7. The fraud detection system of claim 6, wherein capturing the one or more first data values over the first time period comprises placing the one or more first data values in a vesting data set for the first time period, wherein the one or more first data values correspond to one or more transactions processed during the first time period and the second time period, wherein the first data values in the vesting data set and the second data values in a stored data set are collected over one of an hour, a day, a week, a month, a quarter, or a year, and wherein the quantile value estimation operations further comprise:
  creating, using a profile maturation batch process, an ad-hoc simulation of the quantile value profile for a different type of data values using the quantile value profile and at least one of the first merge operation, the second merge operation, or the third merge operation.

8. The fraud detection system of claim 1, wherein the quantile value estimation operations further comprise:
  determining a quantile absolute deviation for the quantile value profile by one of:
    (a) using the real values in the quantile value profile for determining the quantile absolute deviation; or
    (b) inversing natural log transformations corresponding to the first plurality of quantile marker values in the quantile value profile; and
    using the inversed natural log transformations for determining the quantile absolute deviation.

9. A method to estimate quantile values for fraud assessments in a fraud detection system, the method comprising:
  determining a first time period associated with one or more first data values that are designated for updating a quantile value profile usable to perform the fraud assessments, wherein the quantile value profile is associated with an entity;
  capturing, over the first time period, the one or more first data values for the quantile value profile, wherein the quantile value profile is further associated with a second time period and comprises one of (a) real values for one or more second data values for the entity over the second time period or (b) a first plurality of quantile marker values calculated from the one or more second data values;
at an end of the first time period, accessing the quantile value profile for the entity;
determining a first number of the one or more first data values over the first time period; and
based on the first number of the one or more first data values and the one of the real values or the first plurality of quantile marker values in the quantile value profile, performing one of a first merge operation, a second merge operation, or a third merge operation on the one or more first data values captured over the first time period with the one of the real values or the first plurality of quantile marker values in the quantile value profile, wherein the performing the second merge operation and the third merge operation includes:
computing intersections of a parabolic equation between heights and positions of the one or more first data values, the one of the real values, or a combination thereof, and
determining coefficients of the parabolic equation based on the intersections, wherein an output of the parabolic equation comprises different quantile value markers that reduce the number of one of the one or more first data values or the one of the real values, and wherein the coefficients for a parabola of the parabolic equation intersects different ones of the first plurality of quantile marker values and a second plurality of quantile marker values associated with the quantile value profile based on the intersections;
after the second time period, performing a profile update for the quantile value profile by:
determining that a data storage size of the quantile value profile requires a reduction that reduces the quantile value profile to a minimum set of quantile value markers associated with the identified parabolic equation having the determined coefficients, and
reducing the data storage size of the quantile value profile using the third merge operation; and
performing the fraud assessments using the quantile value profile having the profile update, wherein the minimum set of quantile value markers in the quantile value profile are used to replace past data values processed by an intelligent fraud detection engine for the fraud assessments.

10. The method of claim 9, wherein:
the first merge operation comprises merging the one or more first data values with the real values in the quantile value profile,
the second merge operation comprises merging the one or more first data values with the first plurality of quantile marker values using a marker value calculation process including the identified parabolic equation having the determined coefficients, and
the third merge operation further comprises transforming the one or more first data values into the second plurality of quantile marker values and merging the first plurality of quantile marker values with the second plurality of quantile marker values using the marker value calculation process including the identified parabolic equation having the determined coefficients.

11. The method of claim 10, wherein the second merge operation and the third merge operation each further comprise performing a natural log transformation on the one or more first data values prior to merging or transforming the one or more first data values.

12. The method of claim 10, wherein the first plurality of quantile marker values and the second plurality of quantile marker values are associated with five to eleven marker quantiles for the marker value calculation process.

13. The method of claim 9, wherein the one or more first data values and the one or more second data values are associated with at least one of transaction amounts, dates, scores, counts, true and/or false states, ordinal categories, balances, ratios, alpha-numeric strings, serial numbers, list sizes, or values sorted in a descending order, and wherein the intelligent fraud detection engine comprises one or more risk models for the fraud assessments.

14. The method of claim 9, wherein the first time period and the second time period comprise one of an hour, a day, a week, a month, a quarter, or a year.

15. The method of claim 14, wherein capturing the one or more first data values over the first time period comprises placing the one or more first data values in a vesting data set for the first time period, wherein the one or more first data values correspond to one or more transactions processed during the first time period and the second time period, wherein the first data values in the vesting data set and the second data values in a stored data set are collected over one of an hour, a day, a week, a month, a quarter, or a year, and wherein the method further comprises:
creating, using a profile maturation batch process, an ad-hoc simulation of the quantile value profile for a different type of data values using the quantile value profile and at least one of the first merge operation, the second merge operation, or the third merge operation.

16. The method of claim 9, further comprising:
determining a quantile absolute deviation for the quantile value profile by one of:
(a) using the real values in the quantile value profile for determining the quantile absolute deviation; or
(b) inversing natural log transformations corresponding to the first plurality of quantile marker values in the quantile value profile; and
using the inversed natural log transformations for determining the quantile absolute deviation.

17. A non-transitory computer-readable medium having stored thereon computer-readable instructions executable to estimate quantile values for fraud assessments in a fraud detection system, the computer-readable instructions executable to perform quantile value estimation operations which comprises:
determining a first time period associated with one or more first data values that are designated for updating a quantile value profile usable to perform the fraud assessments, wherein the quantile value profile is associated with an entity;
capturing, over the first time period, the one or more first data values for the quantile value profile, wherein the quantile value profile is further associated with a second time period and comprises one of (a) real values for one or more second data values for the entity over the second time period or (b) a first plurality of quantile marker values calculated from the one or more second data values;
at an end of the first time period, accessing the quantile value profile for the entity;
determining a first number of the one or more first data values over the first time period; and
based on the first number of the one or more first data values and the one of the real values or the first plurality of quantile marker values in the quantile value profile, performing one of a first merge operation, a second merge operation, or a third merge operation on the one or more first data values captured over the first time period with the one of the real values or the first plurality of quantile marker values in the quantile value profile, wherein the performing the second merge operation and the third merge operation includes:
computing intersections of a parabolic equation between heights and positions of the one or more first data values, the one of the real values, or a combination thereof, and
determining coefficients of the parabolic equation based on the intersections, wherein an output of the parabolic equation comprises different quantile value markers that reduce the number of one of the one or more first data values or the one of the real values, and wherein the coefficients for a parabola of the parabolic equation intersects different ones of the first plurality of quantile marker values and a second plurality of quantile marker values associated with the quantile value profile based on the intersections;
after the second time period, performing a profile update for the quantile value profile by:
determining that a data storage size of the quantile value profile requires a reduction that reduces the quantile value profile to a minimum set of quantile value markers associated with the identified parabolic equation having the determined coefficients, and
reducing the data storage size of the quantile value profile using the third merge operation; and
performing the fraud assessments using the quantile value profile having the profile update, wherein the minimum set of quantile value markers in the quantile value profile are used to replace past data values processed by an intelligent fraud detection engine for the fraud assessments.

18. The non-transitory computer-readable medium of claim 17, wherein:
the first merge operation comprises merging the one or more first data values with the real values in the quantile value profile,
the second merge operation comprises merging the one or more first data values with the first plurality of quantile marker values using a marker value calculation process including the identified parabolic equation having the determined coefficients, and
the third merge operation further comprises transforming the one or more first data values into the second plurality of quantile marker values and merging the first plurality of quantile marker values with the second plurality of quantile marker values using the marker value calculation process including the identified parabolic equation having the determined coefficients.

19. The non-transitory computer-readable medium of claim 18, wherein the second merge operation and the third merge operation each further comprise performing a natural log transformation on the one or more first data values prior to merging or transforming the one or more first data values.

20. The non-transitory computer-readable medium of claim 18, wherein the first plurality of quantile marker values and the second plurality of quantile marker values are associated with five to eleven marker quantiles for the marker value calculation process.

* * * * *